(12) United States Patent
Nakamura

(10) Patent No.: US 9,507,450 B2
(45) Date of Patent: Nov. 29, 2016

(54) TOUCH PANEL AND METHOD OF MANUFACTURING THE TOUCH PANEL

(71) Applicant: NISSHA PRINTING CO., LTD., Kyoto-shi, Kyoto (JP)

(72) Inventor: Kazuto Nakamura, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/409,401

(22) PCT Filed: Apr. 10, 2013

(86) PCT No.: PCT/JP2013/060845
§ 371 (c)(1),
(2) Date: Dec. 18, 2014

(87) PCT Pub. No.: WO2013/190884
PCT Pub. Date: Dec. 27, 2013

(65) Prior Publication Data
US 2015/0185889 A1    Jul. 2, 2015

(30) Foreign Application Priority Data

Jun. 19, 2012   (JP) .................................. 2012-137769

(51) Int. Cl.
*G06F 3/041*   (2006.01)
*G06F 3/044*   (2006.01)
(Continued)

(52) U.S. Cl.
CPC ................ *G06F 3/041* (2013.01); *B29C 51/10* (2013.01); *G06F 3/044* (2013.01); *B29L 2031/34* (2013.01); *G06F 2203/04102* (2013.01); *G06F 2203/04103* (2013.01); *Y10T 156/1044* (2015.01)

(58) Field of Classification Search
CPC ............... G06F 3/041; G06F 3/044; G06F 2203/04102; G06F 2203/04103; B29C 51/10; B29L 2031/34; Y10T 156/1044; H01B 5/14
See application file for complete search history.

(56) References Cited

U.S. PATENT DOCUMENTS

| | | | |
|---|---|---|---|
| 9,317,140 B2 | 4/2016 | Rosenfeld et al. | |
| 2008/0042997 A1* | 2/2008 | Endo | G06F 3/045 345/176 |
| 2010/0059254 A1* | 3/2010 | Sugiyama | B23K 13/01 174/254 |

(Continued)

FOREIGN PATENT DOCUMENTS

| CN | 101281312 A | 10/2008 |
|---|---|---|
| CN | 102378956 A | 3/2012 |

(Continued)

OTHER PUBLICATIONS

International Search Report in PCT/JP2013/060845 dated Jul. 9, 2013.

*Primary Examiner* — Michael Faragalla
*Assistant Examiner* — Mark Edwards
(74) *Attorney, Agent, or Firm* — Global IP Counselors, LLP

(57) ABSTRACT

To prevent disconnection of a touch panel to which a three-dimensional shape has been imparted, the touch panel includes a first electrode layer that is formed upon a first base material sheet and includes material having flexibility. The first electrode layer has a first electrode part and a first mount part extending from the first electrode part. A first routing circuit layer is formed upon the first mount part. A second electrode layer is formed upon a second base material sheet and includes material which has flexibility. The second electrode layer has a second electrode part and a second mount part extending from the second electrode part. A second routing circuit layer is formed upon the second mount part. A first bonding layer bonds the first base material sheet to the second base material sheet. A second bonding layer bonds the second base material sheet to a protective layer.

6 Claims, 8 Drawing Sheets

(51) Int. Cl.
  *B29C 51/10* (2006.01)
  *B29L 31/34* (2006.01)

(56) References Cited

U.S. PATENT DOCUMENTS

| | | |
|---|---|---|
| 2010/0242274 A1 | 9/2010 | Rosenfeld et al. |
| 2011/0128246 A1 | 6/2011 | Esaka et al. |
| 2011/0248954 A1 | 10/2011 | Hamada et al. |
| 2011/0261009 A1 | 10/2011 | Inagaki et al. |
| 2012/0032916 A1* | 2/2012 | Enoki ............... G06F 3/044 345/174 |
| 2012/0182250 A1* | 7/2012 | Nagata ............... G06F 3/044 345/173 |
| 2013/0335375 A1 | 12/2013 | Nishikawa et al. |

FOREIGN PATENT DOCUMENTS

| | | |
|---|---|---|
| JP | 2008276729 A | 11/2008 |
| JP | 2010-244772 A | 10/2010 |
| JP | 2011-118494 A | 6/2011 |
| JP | WO 2011081112 A1 * | 7/2011 ............ G06F 3/044 |
| JP | 2011-227740 A | 11/2011 |
| JP | 2012-242871 A | 12/2012 |
| WO | 2010-079551 A1 | 7/2010 |

* cited by examiner

TOUCH PANEL AND METHOD OF MANUFACTURING THE TOUCH PANEL

CROSS-REFERENCE TO RELATED APPLICATION

This U.S. National stage application claims priority under 35 U.S.C. §119(a) to Japanese Patent Application No. 2012-137769, filed in Japan on Jun. 19, 2012, the entire contents of Japanese Patent Application No. 2012-137769 are hereby incorporated herein by reference.

BACKGROUND

Field of the Invention

The present invention relates to a touch panel and a method of manufacturing the same, and more particularly relates to a touch panel whereto a three dimensional shape has been imparted and a method of manufacturing the same.

BACKGROUND INFORMATION

The range of application of touch panels has been widening more and more in recent years. For example, whereas planar touch panels were common in the past, the development of three dimensionally shaped touch panels, for example, semispherical touch panels, has been advancing in recent times.

A three dimensional shaped touch panel includes, for example, two electrode films that are layered. Each electrode film includes a base material and electrode layers, which are formed on the base material. Routing circuit layers, which are connected to the electrode layers, are further formed on each electrode film. To enable the three dimensional shape, the electrode layers contain a flexible material. The routing circuit layers are made of a low resistance material and extend from the electrode layers.

When a three dimensional shaped touch panel is to be manufactured, a first electrode film and a second electrode film are adhered to one another, after which a desired three dimensional shape is imparted to the touch panel. At this time, the dimensional change (elongation, bending) in the electrode films is large, and therefore a discontinuity tends to occur in the routing circuit layers. If a discontinuity occurs in one of the routing circuit layers, then the resistance value of that routing circuit layer adversely increases.

SUMMARY

An object of the present invention is to prevent a discontinuity in a touch panel whereto a three dimensional shape has been imparted.

A plurality of aspects are explained below as the solution to the problem. These aspects can be arbitrarily combined as needed.

A touch panel according to one aspect of the present invention is a touch panel whereto a three dimensional shape has been imparted and includes: a first base material, an electrode layer, a routing circuit layer, a second base material, and a bonding layer. The electrode layer is formed on a first surface of the first base material and contains a flexible material. The electrode layer includes an electrode part and a mount part that extends from the electrode part. The routing circuit layer is formed on the mount part. The bonding layer bonds the first surface of the first base material and the second base material.

The material that constitutes the electrode layer is, for example, CNT, graphene, PEDOT, or metal nanowire. The material that constitutes the routing circuit layer is a material wherein, for example, a metal filler (e.g., silver or copper) is dispersed in a binder.

In this touch panel, because the routing circuit layer is formed on the mount part, when the three dimensional shape is to be imparted to the touch panel, even if the routing circuit layer has a discontinuity, the electrical connection with the routing circuit layer having the discontinuity is maintained by the flexible electrode layer. Thereby, an increase in the resistance value of the routing circuit layer owing to a discontinuity is prevented.

A portion of the first base material corresponding to the mount part may be bent.

In this touch panel, because the bent portion of the first base material is a portion that corresponds to the mount part, when the three dimensional shape is to be imparted to the touch panel, even if the routing circuit layer has a discontinuity, the electrical connection with the routing circuit layer having the discontinuity is maintained by the flexible electrode layer. Thereby, an increase in the resistance value of the routing circuit layer owing to a discontinuity is prevented. The bonding layer may contain a macromolecular material, which is set by the irradiation or elimination of energy rays. For example, a thermosetting resin, a thermofusing resin, or an ultraviolet light setting resin is used as the macromolecular material.

In this touch panel, the three dimensional shape is imparted before the bonding layer is set, and therefore the bonding layer tends not to adversely affect the routing circuit layer when the three dimensional shape is imparted. Namely, it is possible to prevent an increase in the resistance value of the routing circuit layer owing to a discontinuity. Thereby, it is furthermore possible to reduce the increase in the resistance value of the routing circuit layer after the three dimensional shape has been imparted.

A touch panel according to another aspect of the present invention is a touch panel whereto a three dimensional shape has been imparted and includes: a first base material, an electrode layer, a routing circuit layer, a second base material, and a bonding layer. The electrode layer is formed on a first surface of the first base material and contains a flexible material. The routing circuit layer is formed on the first surface of the first base material and is electrically connected to the electrode layer. The bonding layer bonds the first surface of the first base material and the second base material and contains a macromolecular material that is set by the irradiation or elimination of energy rays.

In this touch panel, the bonding layer is set after the three dimensional shape has been imparted, and therefore it is possible to prevent the destruction of the routing layer that is induced by the destruction of the bonding layer arising when the three dimensional shape is imparted, and to prevent an increase in the resistance value of the routing circuit layer owing to a discontinuity. Thereby, it is furthermore possible to prevent a decrease is the resistance value of the routing circuit layer after the three dimensional shape has been imparted.

A method of manufacturing a touch panel according to yet another aspect of the present invention is a method of manufacturing a touch panel whereto a three dimensional shape has been imparted and includes:

forming an electrode layer including an electrode part and a mount part that extends from the electrode part, on a first surface of a first base material;

forming a routing circuit layer on the mount part;

adhering, by a bonding layer, the first surface of the first base material and a second base material; and imparting the three dimensional shape to the touch panel, in which the first base material and the second base material have been adhered.

In this method of manufacturing the touch panel, because the routing circuit layer is formed on the mount part, when the three dimensional shape is to be imparted to the touch panel, even if the routing circuit layer has a discontinuity, the electrical connection with the routing circuit layer having the discontinuity is maintained by the flexible electrode layer. Thereby, an increase in the resistance value of the routing circuit layer owing to a discontinuity is prevented.

In the step of imparting the three dimensional shape to the touch panel, a portion of the first base material at which the mount part and the routing circuit layer are formed may be bent.

In this method of manufacturing the touch panel, because the portion of the first base material that is to be bent is the portion corresponding to the mount part, when the three dimensional shape is to be imparted to the touch panel, even if the routing circuit layer has a discontinuity, the electrical connection with the routing circuit layer having the discontinuity is maintained by the flexible electrode layer. Thereby, an increase in the resistance value of the routing circuit layer owing to a discontinuity is prevented.

A method of manufacturing a touch panel may further include setting the bonding layer by the irradiation or elimination of energy rays after the step of imparting the three dimensional shape to the touch panel is performed.

In this method of manufacturing the touch panel, the three dimensional shape is imparted before the bonding layer is set, and therefore the bonding layer tends not to adversely affect the routing circuit layer when the three dimensional shape is imparted. Namely, it is possible to prevent an increase in the resistance value of the routing circuit layer owing to a discontinuity. Thereby, it is furthermore possible to reduce the increase in the resistance value of the routing circuit layer after the three dimensional shape has been imparted.

A method of manufacturing a touch panel according to yet another aspect of the present invention is a method of manufacturing a touch panel whereto a three dimensional shape has been imparted and includes:

forming an electrode layer on a first surface of a first base material;

forming a routing circuit layer on the first surface of the first base material such that the routing circuit layer is electrically connected to the electrode layer;

adhering, by an elastic bonding layer, the first surface of the first base material and a second base material;

imparting the three dimensional shape to the touch panel in which the first base material and the second base material have been adhered; and setting the bonding layer by the irradiation or elimination of energy rays.

In this method of manufacturing the touch panel, the three dimensional shape is imparted before the bonding layer is set, and therefore the bonding layer tends not to adversely affect the routing circuit layer when the three dimensional shape is imparted.

Namely, it is possible to prevent an increase in the resistance value of the routing circuit layer owing to a discontinuity. Thereby, it is furthermore possible to reduce in the resistance value of the routing circuit layer after the three dimensional shape has been imparted.

A method of manufacturing a touch panel according to yet another aspect of the present invention is a method of manufacturing a touch panel whereto a three dimensional shape has been imparted and includes:

forming an electrode layer on a first surface of a first base material;

forming a routing circuit layer on the first surface of the first base material such that the routing circuit layer is electrically connected to the electrode layer;

adhering, by a bonding layer, the first surface of the first base material and a second base material; and imparting the three dimensional shape to the touch panel, in which the first base material and the second base material have been adhered.

At least a location of the routing circuit layer that elongates by the step of imparting the shape to the touch panel is formed by a tensile resistant conductive structure, whose tensile elongation relative to tension in the wiring directions is large. A cross sectional area of a cross section perpendicular to the wiring directions of the tensile resistant conductive structure may be greater than 1× and less than or equal to 16× a cross sectional area of a plane perpendicular to the wiring directions at locations other than the tensile resistant conductive structure of the routing circuit layer.

In this method of manufacturing the touch panel, the routing circuit layer elongates in the wiring directions and therefore is weak against the tensile force in the wiring directions. However, if the location of the routing circuit layer that elongates when the shape is imparted to the touch panel is the tensile resistant conductive structure, whose tensile elongation relative to the tension in the wiring directions is large, then the incidence of breakage of the routing circuit layer is reduced when the shape is being imparted. As a result, it is possible to prevent an increase in the resistance value of the routing circuit layer owing to breakage of the routing circuit layer when the shape is imparted.

In particular, by setting the cross sectional area of the tensile resistant conductive structure greater than 1× the cross sectional area of other locations of the routing layer, the cross sectional area tends not to become small even if the tensile resistant conductive structure deforms when the three dimensional shape is imparted. Namely, the tensile stress per unit of area of the tensile resistant conductive structure tends not to become large. Thereby, even if the tensile resistant conductive structure elongates owing to the imparting of the three dimensional shape, the incidence of breakage in the tensile resistant conductive structure is reduced and it is possible to prevent an increase in the resistance value of the routing layer owing to breakage. In addition, it is also possible to prevent an increase in the resistance value of the tensile resistant conductive structure owing to the decrease in the cross sectional area of the tensile resistant conductive structure.

A thickness and a width of the tensile resistant conductive structure may be greater than 1× and less than or equal to 4× a thickness and a width, respectively, of locations other than the tensile resistant conductive structure of the routing circuit layer.

In this method of manufacturing the touch panel, even if it is necessary to increase the density of the routing circuit layers and the circuit width of the routing circuit layers cannot be increased, the cross sectional area of the routing circuit layer can be increased. In addition, for example, by making the circuit width of the tensile resistant conductive structure large, the cross sectional area of the routing circuit layer can be increased while processes needed for increasing the thickness of the routing circuit layer, such as double coating the routing circuit layer, can be omitted. Based on the above, a touch panel that has a prescribed three dimensional shape and wherein the resistance value of the routing circuit layer is small can be manufactured with good efficiency.

A touch panel according to another aspect of the present invention is a touch panel whereto a three dimensional shape has been imparted and includes a first base material, an electrode layer, a routing circuit layer, a second base material, and a bonding layer. The electrode layer is formed on a first surface of the first base material and contains a flexible material. The routing circuit layer is formed on the first surface of the first base material such that the routing circuit layer is electrically connected to the electrode layer and contains an electrically conductive material whose tensile elongation is 10% or greater. The bonding layer bonds the first surface of the first base material and the second base material.

The electrically conductive material may be an electrically conductive paste that contains an elastomer (e.g., a polyurethane elastomer), which serves as a binder component.

Furthermore, "tensile elongation" is a physical property measurement item that indicates how much a film elongates when it is tensioned.

In this touch panel, the tensile elongation of the electrically conductive material is 10% or greater, which makes it possible to reduce the incidence of time dependent breakage of the routing circuit layer that arises owing to the residual stress of the routing circuit layer after the three dimensional shape has been imparted. Thereby, the resistance value of the routing circuit layer over the long term can be reduced, and the lifespan of the touch panel whereto the three dimensional shape has been imparted can be lengthened.

A touch panel according to another aspect of the present invention is a touch panel whereto a three dimensional shape has been imparted and includes a first base material, an electrode layer, a routing circuit layer, a second base material, and a bonding layer. The electrode layer is formed on a first surface of the first base material and contains a flexible material. The routing circuit layer is formed on the first surface of the first base material such that the routing circuit layer is electrically connected to the electrode layer. The bonding layer bonds the first surface of the first base material and the second base material.

At least part of the routing circuit layer includes a portion that elongates in directions diagonal to wiring directions of the routing circuit layer.

The abovementioned portion that elongates in the diagonal direction may be, for example, an accordion solid shape or a zigzag shape that elongates in the wiring directions, and may be a mesh shape that includes lines that elongate in directions diagonal to the wiring directions.

In this touch panel, if the routing circuit layer has elongated to an extent that the circuit remains in the directions diagonal to the wiring directions after the three dimensional shape has been imparted, then the residual stress of the routing circuit layer can be made smaller than in the case wherein the routing circuit layer completely elongates. Thereby, the incidence of breakage of the routing circuit layer owing to residual stress after the three dimensional shape has been imparted is reduced, and the resistance value of the routing circuit layer is reduced over the long term. Thereby, the lifespan of the touch panel whereto the three dimensional shape has been imparted can be lengthened.

In a touch panel and a method of manufacturing the same according to the present invention, a discontinuity in the touch panel whereto a three dimensional shape has been imparted tends not to occur.

DETAILED DESCRIPTION OF EMBODIMENTS (1) First Embodiment

Figure 1:
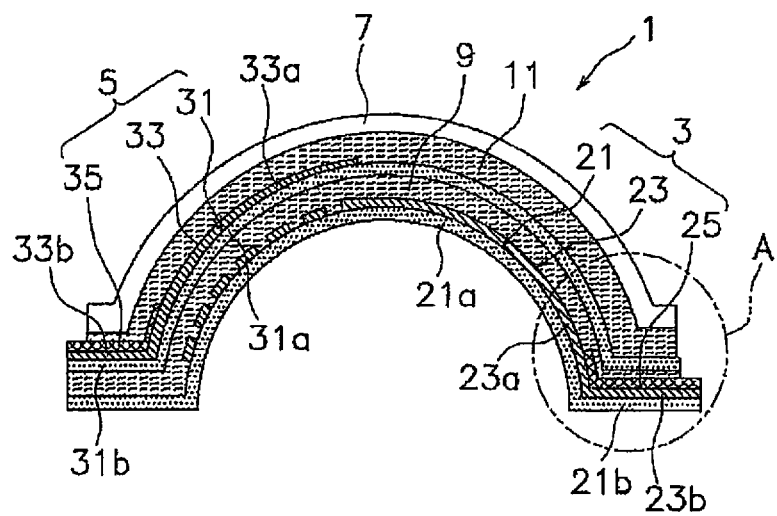
FIG. 1 is a cross sectional view of a touch panel according to a disclosed embodiment.
Figure 2:
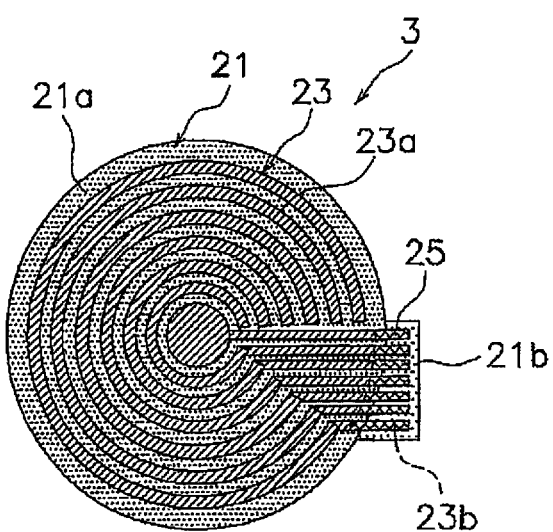
FIG. 2 is a plan view of a first electrode film.
Figure 3:
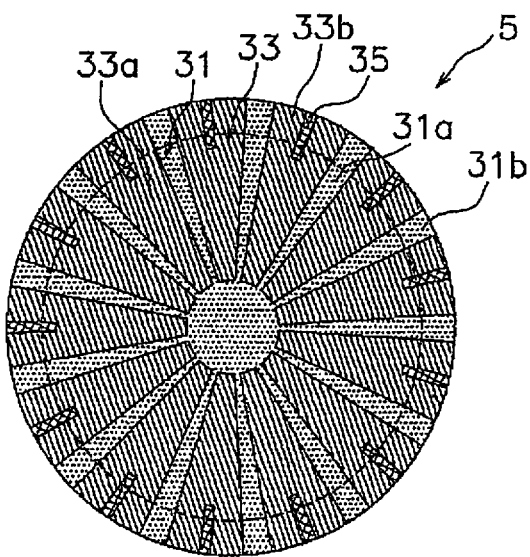
FIG. 3 is a plan view of a second electrode film.

A touch panel 1 according to one embodiment of the present invention will be explained, referencing FIG. 1 through FIG. 3. FIG. 1 is a cross sectional view of the touch panel. FIG. 2 is a plan view of a first electrode film. FIG. 3 is a plan view of a second electrode film.

The touch panel 1 is an electrostatic capacitance type touch sensor and has a three dimensional shape, more specifically, a semispherical shape. The touch panel 1 is configured such that XY coordinates are input by an operator touching the touch panel 1 with his or her finger.

The touch panel 1 principally includes a first electrode film 3, a second electrode film 5, and a protective layer 7. The second electrode film 5 is disposed on the first electrode film 3. The protective layer 7 is disposed on the second electrode film 5. The touch panel 1 further includes a first bonding layer 9 and a second bonding layer 11. The first bonding layer 9 is disposed between the first electrode film 3 and the second electrode film 5. The second bonding layer 11 is disposed between the second electrode film 5 and the protective layer 7.

The first electrode film 3 includes a first base material sheet 21, first electrode layers 23, and first routing circuit layers 25. The first base material sheet 21 is a thin, sheet shaped member. The first base material sheet 21 includes a semispherical part 21a and a flat peripheral part 21b, which is disposed at the circumference of the semispherical part 21a. As shown in FIG. 2, each first electrode layer 23 includes a first electrode part 23a and a first mount part 23b. The first electrode parts 23a are formed on the semispherical part 21a and, as shown in FIG. 2, are spherical shapes or concentric circular shapes. Each first electrode part 23a further includes a linear part, which extends from a spherical or circular end part.

The first mount parts 23b are principally formed on the peripheral part 21b and are connected to the end parts of the linear parts of the first electrode parts 23a.

The first routing circuit layers 25 are formed on the first mount parts 23b. More specifically, as shown in FIG. 1, the first routing circuit layers 25 are formed over the semispherical portions and the flat portions of the first mount parts 23b. Furthermore, as shown in FIG. 2, the width of the first routing circuit layers 25 in the circumferential directions is substantially the same as that of the first electrode parts 23a and the first mount parts 23b.

Figure 4:
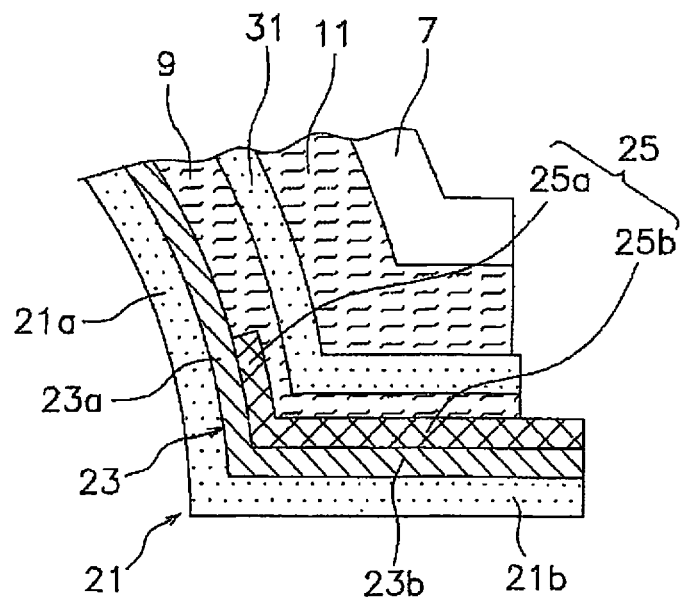
FIG. 4 is an enlarged view of a circle A in FIG. 1.

Furthermore, the first routing circuit layer 25 will now be explained in detail, referencing FIG. 4. The first routing circuit layer 25 includes a first portion 25a, which corresponds to the semispherical portion of the first mount part 23b, and a second portion 25b, which corresponds to the flat portion of the first mount part 23b.

The second electrode film 5 includes a second base material sheet 31, second electrode layers 33, and second routing circuit layers 35. The second base material sheet 31 is a thin, sheet shaped member. The second base material sheet 31 includes a semispherical part 31a and a flat peripheral part 31b, which is disposed at the circumference of the semispherical part 31a. As shown in FIG. 3, each second electrode layer 33 includes a second electrode part 33a and a second mount part 33b. The second electrode parts 33a are formed on the semispherical part 31a; furthermore, as shown in FIG. 3, the second electrode parts 33a constitute a plurality of members that are elongated in the radial directions. The width in the circumferential directions of each second electrode part 33a increases toward the outer side in the radial directions. The second mount parts 33b are principally formed on the peripheral part 3 lb and are connected to the end parts of the second electrode parts 33a.

The second routing circuit layers 35 are formed on the second mount parts 33b. More specifically, as shown in FIG. 1 and FIG. 3, the second routing circuit layers 35 are formed over the semispherical portions and the flat portions of the second mount parts 33b. Furthermore, as shown in FIG. 3, the width of the second routing circuit layers 35 in the circumferential directions is less than that of the second electrode parts 33a and the second mount parts 33b.

Furthermore, the first routing circuit layers 25 and the second routing circuit layers 35 are connected to an external circuit on which an IC chip is installed.

The first base material sheet 21, the second base material sheet 31, and the protective layer 7 are made of, for example, a transparent plastic film. Polyethylene terephthalate resin (PET), polycarbonate resin (PC), polyester sulfone resin (PES), polyarylate resin (PAR), or norbornene resin can be used as the transparent plastic film. A hard coating layer may be formed on an upper surface of the protective layer 7. Examples of materials that can be used as the hard coating layer include: inorganic materials, such as siloxane based resin; and organic materials, such as acrylic epoxies, urethane based thermosetting resins, and acrylate based photo-setting resins.

The first electrode layers 23 and the second electrode layers 33 are made of a flexible conductive material. For example, carbon nanotubes (CNT), polyethylenedioxythiophene (PEDOT), or metal nanowire is used as the flexible conductive material. These materials are preferable because they have satisfactory bendability and elongatability.

The first routing circuit layers 25 and the second routing circuit layers 35 are made of a material wherein an electrically conductive filler is dispersed in a binder. For example, a polyester resin is used as the binder, and silver powder is used as the electrically conductive filler. As one embodiment, if the polyester resin is 12 wt % and the silver powder is 88 wt %, then an easy-to-elongate routing circuit layer is obtained.

The first bonding layer 9 and the second bonding layer 11 are made of, for example, a thermosetting resin, an ultraviolet light setting resin, or a thermofusing resin.

A method of manufacturing the touch panel 1 will now be explained.

First, the first electrode film 3, the second electrode film 5, and the protective layer 7 are separately formed. In the manufacture of the first electrode film 3 and the second electrode film 5, first, the electrode layers are formed on a plastic film; next, the routing circuit layers are formed; lastly, the bonding layer is formed. The electrode layers are formed by, first, forming a conductive film on the plastic film by, for example, a vacuum evaporating method, sputtering, ion plating, a CVD method, or a roll coating method, and then patterning such by etching. The first routing circuit layers 25 and the second routing circuit layers 35 are formed by, for example, printing with electrically conductive paste.

Next, the first electrode film 3 and the second electrode film 5 are adhered to one another.

Subsequently, the protective layer 7 is adhered to the second electrode film 5.

When the flat plate shaped touch panel has been completed in this manner, next, a three dimensional shape is imparted to the touch panel. In the present embodiment, the touch panel is shaped into a semispherical shape. The method of shaping the touch panel into a three dimensional shape is, for example, vacuum molding. In this state, the first bonding layer 9 and the second bonding layer 11 are set by being irradiated with ultraviolet rays, heated, or cooled. In so doing, the touch panel 1 is complete.

In the present method of manufacturing the touch panel, the first bonding layer 9 and the second bonding layer 11 are set after the three dimensional shape has been imparted, and therefore the first bonding layer 9 and the second bonding layer 11 tend not to adversely affect the first routing circuit layers 25 and the second routing circuit layers 35. Namely, it is possible to prevent an increase in the resistance values of the first routing circuit layers 25 and the second routing circuit layers 35 owing to a discontinuity.

In addition, in the touch panel 1, because the first routing circuit layers 25 are formed on the first mount parts 23b and, furthermore, the second routing circuit layers 35 are formed on the second mount parts 33b, when the three dimensional shape is to be imparted to the touch panel, even if the first routing circuit layers 25 or the second routing circuit layers 35 have a discontinuity, the electrical connection with the routing circuit layer having the discontinuity is maintained by the flexible first electrode layers 23 and second electrode layers 33. Thereby, an increase in the resistance value of the first routing circuit layers 25 and the second routing circuit layers 35 owing to a discontinuity is prevented.

Here, the present embodiment will be explained in further detail, referencing FIG. 4. FIG. 4 is an enlarged view of a circle A in FIG. 1. Furthermore, the explanation below applies likewise to the second routing circuit layers 35.

Prior to imparting the three dimensional shape (in the state prior to that shown in FIG. 4), the first routing circuit layers 25 are flat plate shapes that follow along the first base material sheet 21 and the first electrode layers 23. In addition, the first bonding layer 9 is disposed, in a fluid state, on the upper surfaces of the first routing circuit layers 25. If the three dimensional shape is imparted in this state, then the first electrode layers 23, together with the first base material sheet 21, will bend at the portions shown in FIG. 4 and, attendant therewith, the first routing circuit layers 25 will fold. As a result, the first routing circuit layers 25 will be pulled in the wiring directions (the left-right directions in FIG. 4).

However, in the present embodiment, even if one of the first routing circuit layers 25 develops a discontinuity, the electrical connection with the first routing circuit layer 25 having the discontinuity is maintained by the corresponding flexible first electrode layer 23. Thereby, an increase in the resistance value of the first routing circuit layer 25 owing to the discontinuity is prevented.

In addition, when the three dimensional shape is being imparted, the first bonding layer 9 is in the fluid state, and therefore the first bonding layer 9 easily follows the elongation and shortening of the adjacent members. Namely, the first bonding layer 9 tends not to peel off of the first electrode layers 23 and the first routing circuit layers 25. As a result, the electrical connections of the first routing circuit layers 25 are maintained.

The electrically conductive material of the electrode parts and the mount parts of the electrode layers may be varied. In this case, it is preferable that the flexibility of the mount parts is high.

The mount parts of the electrode layers are preferably formed over all wiring directions of the routing circuit layers. However, the mount parts of the electrode layers may be formed over just some of the wiring directions of the routing circuit layers, as long as they correspond to locations that elongate when the three dimensional shape is being imparted to the touch panel.

The mount parts of the electrode layers do not have to correspond to all width directions of the routing circuit layers. That is, in this case, the routing circuit layers are formed with a width greater than that of the mount parts and on both the mount parts and the base material sheets.

In the embodiment discussed above, the relationship between the first base material sheet 21 of the first electrode film 3 and the second base material sheet 31 of the second electrode film 5 and the relationship between the second base material sheet 31 of the second electrode film 5 and the protective layer 7 have in common that a second base material is bonded onto a first base material, whereon electrodes are formed, via a bonding layer. In the former case, the first base material sheet 21 corresponds to the first base material, and the second base material sheet 31 corresponds to the second base material; in the latter case, the second base material sheet 31 corresponds to the first base material, and the protective layer 7 corresponds to the second base material.

In addition, another aspect is explained below, with attention to the point that the abovementioned touch panel 1 includes three base materials. The touch panel 1 is a touch panel to which a three dimensional shape has been imparted, and includes the first base material sheet 21, the first electrode layers 23, the first routing circuit layers 25, the second base material sheet 31, the second electrode layers 33, the first bonding layer 9, the protective layer 7, and the second bonding layer 11.

The three base materials discussed above are the first base material sheet 21, the second base material sheet 31, and the protective layer 7. The first base material sheet 21 is one example of a first base material. The second base material sheet 31 is one example of a second base material. The protective layer 7 is one example of a third base material.

The first electrode layers 23 are formed on the first base material sheet 21 and contain a flexible material. Each first electrode layer 23 includes the first electrode part 23a and the first mount part 23b, which extends from the first electrode part 23a. The first routing circuit layers 25 are formed on the first mount parts 23b. The second electrode layers 33 are formed on the second base material sheet 31 and contain a flexible material.

Each second electrode layer 33 includes the second electrode part 33a and the second mount part 33b, which extends from the second electrode part 33a. The second routing circuit layers 35 are formed on the second mount parts 33b. The first bonding layer 9 bonds the first base material sheet 21 (one example of the first base material) and the second base material sheet 31 (one example of the second base material). The second bonding layer 11 bonds the second base material sheet 31 (one example of the second base material) and the protective layer 7 (one example of the third base material).

(2) Second Embodiment

Figure 5:
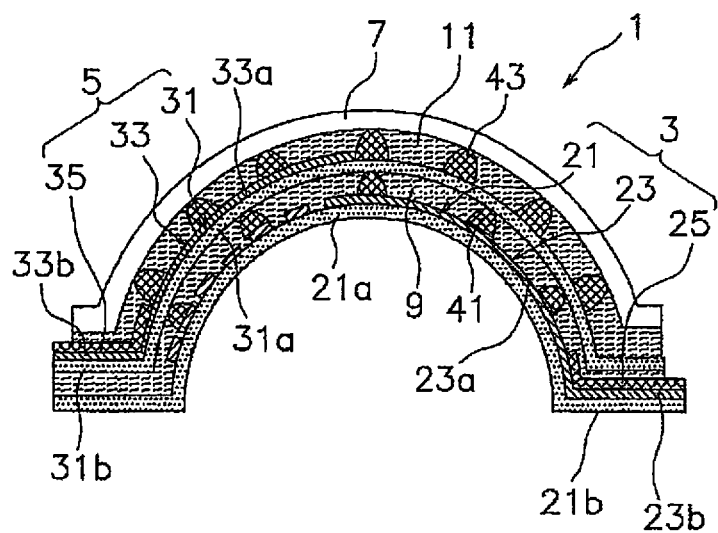
FIG. 5 is a cross sectional view of the touch panel according to a second embodiment.

An embodiment will be further explained wherein a fluid material is used in the bonding layers and is set after the three dimensional shape has been imparted. In this case, in contrast to the case wherein adhesive sheets are used in the bonding layers, it is assumed that there is a problem in that it is difficult to dispose the bonding layers with even thickness. Accordingly, to solve such a problem, it is conceivable to dispose spacers between the first electrode film and the second electrode film and between the second electrode film and the protective layer, as shown in FIG. 5. In FIG. 5, a plurality of first spacers 41 is formed on the first base material sheet 21, and second spacers 43 are formed on the second base material sheet 31. As a result, the thickness becomes even over the entirety between the first electrode film 3 and the second electrode film 5 and between the second electrode film 5 and the protective layer 7.

(3) Third Embodiment

Figure 6:
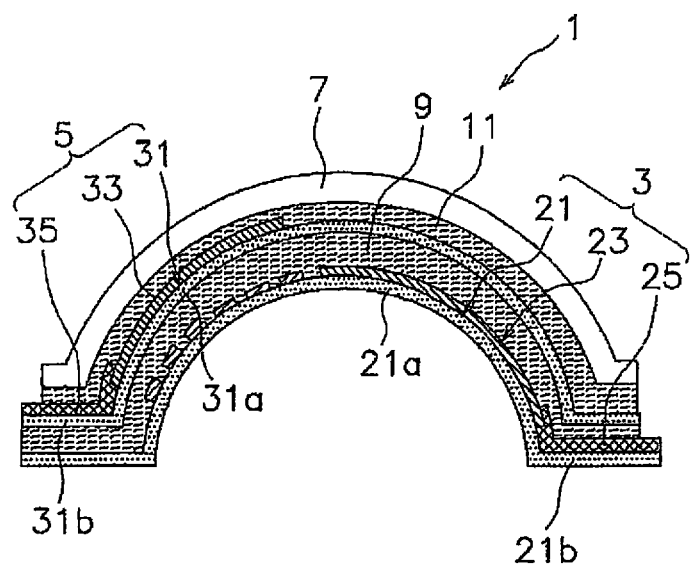
FIG. 6 is a cross sectional view of the touch panel according to a third embodiment.
Figure 7:
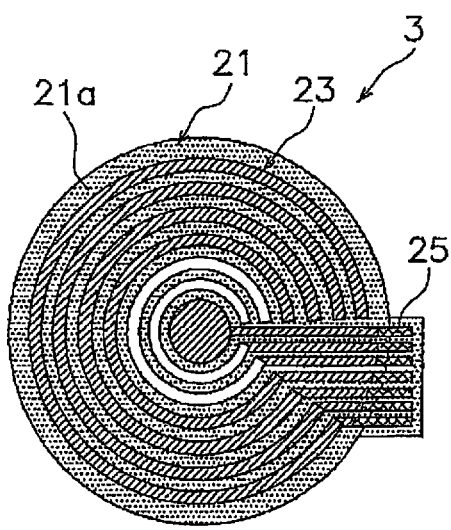
FIG. 7 is a plan view of the first electrode film according to the third embodiment.
Figure 8:
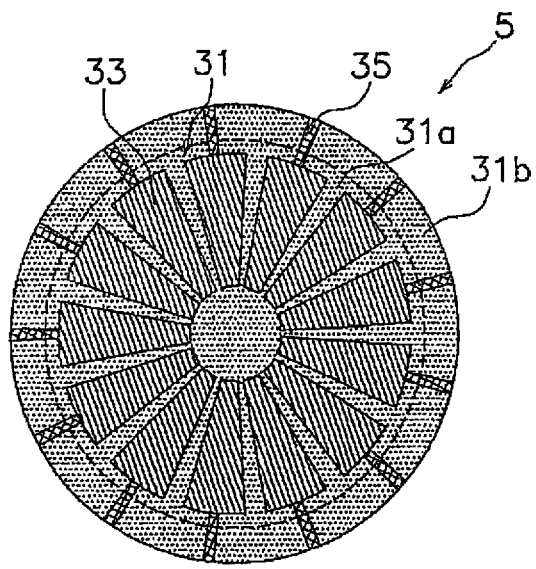
FIG. 8 is a plan view of the second electrode film according to the third embodiment.

Furthermore, in an embodiment wherein a fluid material is used in the bonding layers and the material is set after the three dimensional shape has been imparted, the effect of preventing a discontinuity, even if the routing circuit layers are formed directly on the base material sheets, is achieved, as shown in FIG. 6 through FIG. 8.

Fourth through eighth embodiments discussed below have in common that, by providing characteristics to the structure of the routing circuit layers, the tensile elongation relative to the tension in the wiring directions is 5% or greater with respect to the locations (hereinbelow, tensile resistant conductive structures) of the routing circuit layers that elongate when the three dimensional shape is imparted to the touch panel. Furthermore, the tensile elongation of the tensile resistant conductive structures relative to tension in the wiring directions is preferably 10% or greater, and is more preferably 15% or greater. This is because, if the tensile elongation is too small, then the elongation of the base material sheets cannot be followed when the three dimensional shape is imparted, which adversely results in discontinuities.

In addition, the fourth through eighth embodiments sufficiently obtain the effects, even when combined with the third embodiment; furthermore, the fourth through eighth embodiments may be combined with the first and second embodiments.

Furthermore, the tensile elongation (breaking elongation) conforms to JIS-C-2151.

(4) Fourth Embodiment

Figure 9:
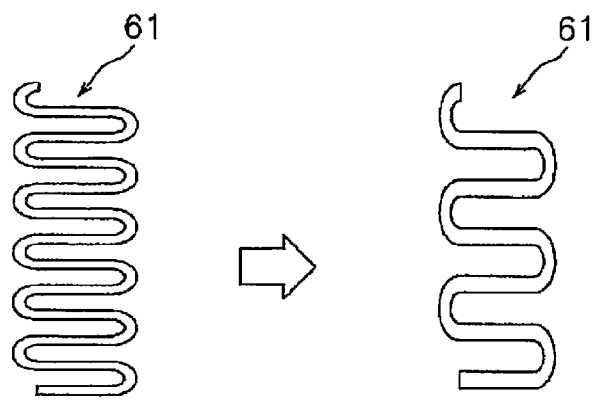
FIG. 9 is a schematic plan view of a routing circuit layer according to a fourth embodiment.

As shown in FIG. 9, a tensile resistant conductive structure 61 has an accordion shape or a zigzag shape that elongates in the wiring directions (the up and down directions in FIG. 9). By virtue of the tensile resistant conductive structure 61 having an accordion shape or a zigzag shape, the tensile resistant conductive structure 61 includes numerous circuits that elongate in directions diagonal to the wiring directions. Thereby, compared to the case wherein there is one circuit that elongates in the diagonal directions, the routing circuit layers can be elongated with a weaker tensile force. As a result, the incidence of breakage in the routing circuit layers can be further reduced, even if the material with which the routing circuit layers are formed lack sufficient tensile strength.

(5) Fifth Embodiment

Figure 10:
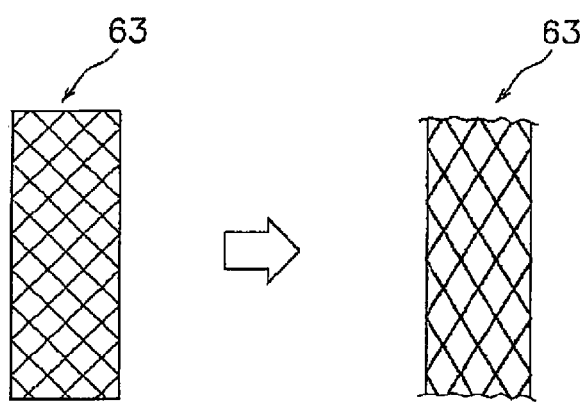
FIG. 10 is a schematic plan view of the routing circuit layer according to a fifth embodiment.

As shown in FIG. 10, a tensile resistant conductive structure 63 has a mesh shape that is configured by lines, which elongate in directions diagonal to the wiring directions. Because the mesh shape has a plurality of zigzag shapes parallel to the wiring directions, more numerous conducting pathways can be ensured than in the case of a single zigzag shape. Thereby, in the step of imparting a shape to the touch panel, even if any of the zigzag shaped circuits of the mesh shape breaks, another circuit that is not broken can complement the conducting pathway. As a result, even if the material with which the routing circuit layers are formed lacks adequate tensile strength, the incidence of breakage in the routing circuit layers is reduced.

(6) Sixth Embodiment

Figure 11:
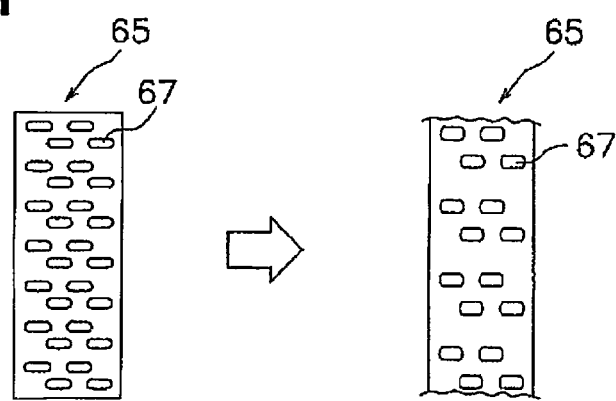
FIG. 11 is a schematic plan view of the routing circuit layer according to a sixth embodiment.

As shown in FIG. 11, a tensile resistant conductive structure 65 has a plurality of recessed parts or hole parts 67. Each recessed part or hole part 67 induces elongation in the routing circuit layer relative to the tension. The recessed parts, which are of a shape and size, provided in the routing circuit layers are provided with an appropriate density, and thereby the incidence of breakage in portions wherein the recessed parts are not provided is reduced. As a result, even if the material with which the routing circuit layers are formed lacks sufficient tensile strength, the incidence of breakage in the routing circuit layers is reduced.

The recessed parts or hole parts 67 have a circular shape, an oval shape, an elliptical shape, a rectangular shape, a rhombic shape, or some other shape. The size of each recessed part or hole part 67 is in the range of 20-500 μm in the tension directions, and is in the range of 20-500 μm in the directions orthogonal to the tension directions. In addition, the density of the recessed parts or hole parts 67 is 0.1-1000 parts/mm$^2$.

(7) Seventh Embodiment

Figure 12:
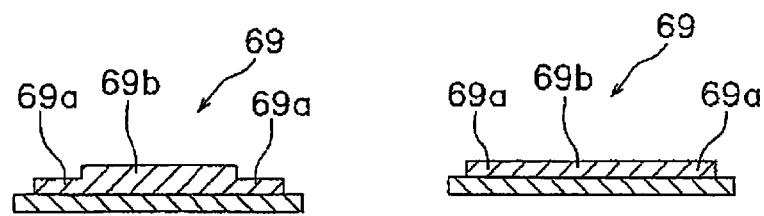
FIG. 12 is a schematic plan view of the routing circuit layer according to a seventh embodiment.

As shown in FIG. 12, a routing circuit layer 69 includes a second portion 69b (i.e., a tensile resistant conductive structure), whose thickness is greater than that of regular first portions 69a.

When a three dimensional shape is imparted to the touch panel, the routing circuit layer 69 elongates in wiring directions (in FIG. 12, the left-right directions), and the thickness of the second portion 69b decreases and approaches the thickness of the first portions 69a. However, the thickness of the second portion 69b is set in advance to a large thickness, and therefore a discontinuity tends not to occur.

Even if it is necessary to increase the density of the routing circuit layers and the circuit width of the routing circuit layers cannot be increased, the cross sectional area of the routing circuit layers can be increased. Thereby, a touch panel that has a prescribed three dimensional shape and wherein the density of the routing circuit layers is high can be manufactured with good efficiency.

The thickness of the second portion 69b is preferably greater than 1× and less than or equal to 4× the thickness of the first portions 69a. This is because, if the second portion 69b is too thick, then productivity will decrease owing to an increase in the number of overcoatings.

(8) Eighth Embodiment

Figure 13:
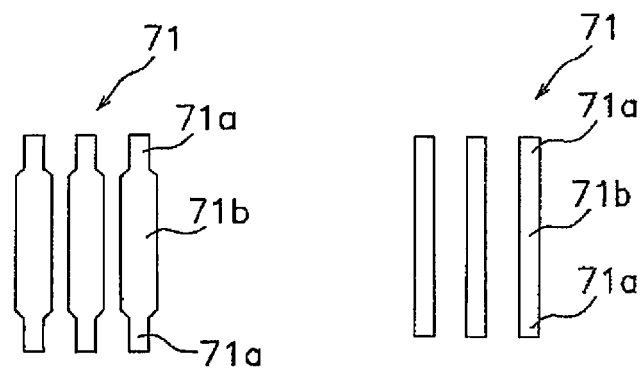
FIG. 13 is a schematic plan view of the routing circuit layers according to an eighth embodiment.

As shown in FIG. 13, routing circuit layers 71 each include a second portion 71b (tensile resistant conductive structure), whose width is greater than that of regular first portions 71a.

When a three dimensional shape is imparted to the touch panel, each routing circuit layer 71 elongates in the wiring directions (in FIG. 13, the up and down directions), and the width of the second portion 71b decreases and approaches the widths of the first portions 71a. However, because the width of the second portion 71b is set large in advance, discontinuities tend not to occur. By making the width of the second portion 71b large in this manner, the cross sectional area of the routing circuit layers can be increased while processes needed for increasing the thickness of the routing circuit layers, such as double coating the routing circuit layers, can be omitted. Thereby, a touch panel that has a prescribed three dimensional shape and wherein the resistance value of the routing circuit layers is small can be manufactured with good efficiency.

The width of the second portion 71b is preferably greater than 1× and less than or equal to 4× the width of the first portions 71a. This is because, if the circuit width of the second portion 71b is set too large, then it will become problematic to dispose the numerous routing circuit layers.

In the abovementioned seventh embodiment and eighth embodiment, the cross sectional area of the tensile resistant conductive structures of the routing circuit layers is set larger than the cross sectional area of the first portions. Accordingly, the cross sectional area tends not to become small even if the tensile resistant conductive structures deform when the three dimensional shape is imparted. Namely, the tensile stress per unit of area of the tensile resistant conductive structures tends not to become large. By making the cross sectional area large in this manner, the tensile elongation of the tensile resistant conductive structures becomes large. That is, even if the tensile resistant conductive structures elongate owing to the imparting of the three dimensional shape, the incidence of breakage in the tensile resistant conductive structures is reduced. In addition, it is also possible to prevent an increase in the resistance value of the tensile resistant conductive structures owing to the decrease in the cross sectional area of the tensile resistant conductive structures.

The cross sectional area of the cross section perpendicular to the wiring directions of the tensile resistant conductive structures is preferably greater than 1× and less than or equal to 16× the cross sectional area of the plane perpendicular to the wiring directions at the locations other than the locations of the tensile resistant conductive structures. This is because, if the cross sectional area of the second portion is set too large, then, for example, productivity will decrease owing to the increase in the number of overcoatings, it will become difficult to dispose the numerous routing circuit layers, and the like.

The thickness or the width, or both, of the tensile resistant conductive structures may be varied in accordance with the coefficient of elongation of the circuit.

Furthermore, in one embodiment, the width of the regular portions is, for example, 0.200 mm, and the thickness is 10.00 µm. The width and thickness of the tensile resistant conductive structure are preferably in the range of 1.0×-2.2× the regular portions.

(9) Ninth Embodiment

Figure 14:
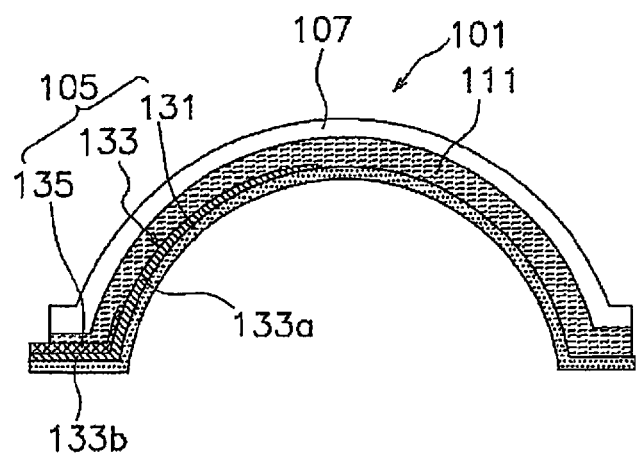
FIG. 14 is a cross sectional view of the touch panel according to a ninth embodiment.
Figure 15:
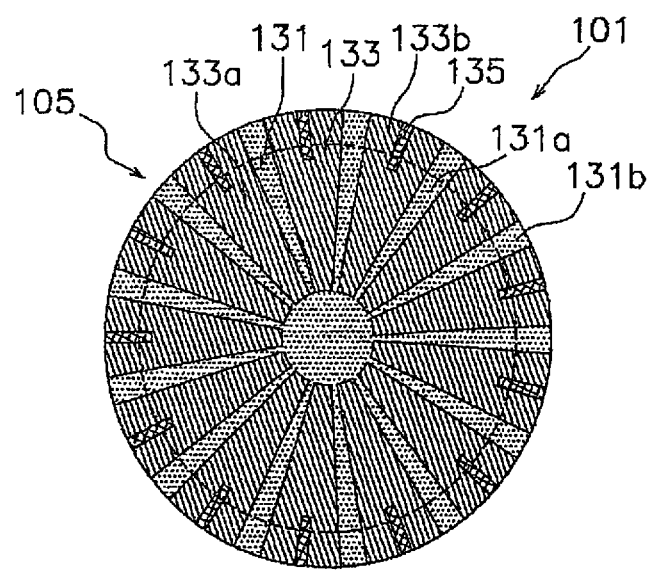
FIG. 15 is a plan view of the touch panel according to a tenth embodiment.

A touch panel 101 according to one embodiment of the present invention will be explained, referencing FIG. 14 and FIG. 15. FIG. 14 is a cross sectional view of the touch panel. FIG. 15 is a plan view of the touch panel.

The touch panel 101 is an electrostatic capacitance type touch sensor and has a three dimensional shape, more specifically, a semispherical shape. The touch panel 101 is configured such that XY coordinates are input by an operator touching the touch panel 101 with his or her finger.

The touch panel 101 includes an electrode film 105 and a protective layer 107 (one example of the second base material). The protective layer 107 is disposed on the electrode film 105. The touch panel 101 further includes a bonding layer 111. The bonding layer 111 is disposed between the electrode film 105 and the protective layer 107.

The electrode film 105 includes a base material sheet 131 (one example of the first base material), electrode layers 133, and routing circuit layers 135. The base material sheet 131 is a thin, sheet shaped member. The base material sheet 131 includes a semispherical part 131a and a flat peripheral part 131b, which is disposed at the circumference of the semispherical part 131a. As shown in FIG. 14 and FIG. 15, each electrode layer 133 includes an electrode part 133a and a mount part 133b. The electrode parts 133a are formed on the semispherical part 131a; furthermore, as shown in FIG. 15, the electrode parts 133a constitute a plurality of members that are elongated in the radial directions. The width in the circumferential directions of each electrode part 133a increases toward the outer side in the radial directions. The mount parts 133b are principally formed on the peripheral part 131b and are connected to the end parts of the electrode parts 133a.

The routing circuit layers 135 are formed on the mount parts 133b. More specifically, as shown in FIG. 14 and FIG. 15, the routing circuit layers 135 are formed over the semispherical portions and the flat portions of the mount parts 133b. Furthermore, as shown in FIG. 15, the width of the routing circuit layers 135 in the circumferential directions is less than that of the electrode parts 133a and the mount parts 133b.

Furthermore, the routing circuit layers 135 are connected to an external circuit on which an IC chip is installed.

The base material sheet 131 and the protective layer 107 are made of, for example, a transparent plastic film. Polyethylene terephthalate resin (PET), polycarbonate resin (PC), polyester sulfone resin (PES), polyarylate resin (PAR), or norbomene resin can be used as the transparent plastic film. A hard coating layer may be formed on the upper surface of the protective layer 107. Examples of materials that can be used as the hard coating layer include: inorganic materials, such as siloxane based resin; and organic materials, such as acrylic epoxies, urethane based thermosetting resins, and acrylate based photosetting resins.

The electrode layers 133 are made of a flexible conductive material. For example, carbon nanotubes (CNT), polyethylenedioxythiophene (PEDOT), or metal nanowire is used as the flexible conductive material. These materials are preferable because they have satisfactory bendability and elongatability.

The routing circuit layers 135 are made of a material wherein an electrically conductive filler is dispersed in a binder. For example, a polyester resin is used as the binder, and silver powder is used as the electrically conductive filler. As one embodiment, if the polyester resin is 12 wt % and the silver powder is 88 wt %, then an easy-to-elongate routing circuit layer is obtained.

The bonding layer 111 is made of, for example, a thermosetting resin, an ultraviolet light setting resin, or a thermofusing resin.

A method of manufacturing the touch panel 101 will now be explained.

First, the electrode film 105 and the protective layer 107 are separately prepared. In the manufacture of the electrode film 105, first, the electrode layers are formed on a plastic film; next, the routing circuit layers are formed; lastly, the bonding layer is formed. The electrode layers are formed by, first, forming a conductive film on the plastic film by, for example, a vacuum evaporating method, sputtering, ion plating, a CVD method, or a roll coating method, and then patterning such by etching. The routing circuit layers 135 are formed by, for example, printing with electrically conductive paste.

Next, the protective layer 107 is adhered to the electrode film 105.

When the flat plate shaped touch panel has been completed in this manner, next, a three dimensional shape is imparted to the touch panel. In the present embodiment, the touch panel is shaped into a semispherical shape. The method of shaping the touch panel into a three dimensional shape is, for example, vacuum molding. In this state, the bonding layer 111 is set by being irradiated with ultraviolet rays, heated, or cooled. In so doing, the touch panel 101 is complete.

In the present method of manufacturing the touch panel, the bonding layer 111 is set after the three dimensional shape has been imparted, and therefore the bonding layer 111 tends not to adversely affect the routing circuit layers 135. Namely, it is possible to prevent an increase in the resistance values of the routing circuit layers 135 owing to a discontinuity.

In addition, in the touch panel 101, because the routing circuit layers 135 are formed on the mount parts 133b, when the three dimensional shape is to be imparted to the touch panel, even if the routing circuit layers 135 have a discontinuity, the electrical connection with the routing circuit layer having the discontinuity is maintained by the flexible electrode layers 133. Thereby, an increase in the resistance value of the routing circuit layers 135 owing to a discontinuity is prevented.

Here, the present embodiment will be explained in further detail.

Prior to imparting the three dimensional shape, the routing circuit layers 135 are flat plate shapes that follow along the base material sheet 131 and the electrode layers 133. In addition, the bonding layer 111 is disposed, in a fluid state, on the upper surfaces of the routing circuit layers 135. If the three dimensional shape is imparted in this state, then the electrode layers 133, together with the base material sheet 131, will bend and, attendant therewith, the routing circuit layers 135 will fold. As a result, the routing circuit layers 135 will be pulled in the wiring directions. However, in the present embodiment, even if one of the routing circuit layers 135 develops a discontinuity, the electrical connection with the routing circuit layer 135 having the discontinuity is maintained by the corresponding flexible electrode layer 133. Thereby, an increase in the resistance value of the routing circuit layer 135 owing to the discontinuity is prevented.

In addition, when the three dimensional shape is being imparted, the bonding layer 111 is in the fluid state, and therefore the bonding layer 111 easily follows the elongation and shortening of the circumferential members. Namely, the bonding layer 111 tends not to peel off of the electrode layers 133 and the routing circuit layers 135. As a result, the electrical connections of the routing circuit layers 135 are maintained.

The electrically conductive material of the electrode parts and the mount parts of the electrode layers may be varied. In this case, it is preferable that the flexibility of the mount parts is high.

The mount parts of the electrode layers are preferably formed over all wiring directions of the routing circuit layers. However, the mount parts of the electrode layers may be formed over just some of the wiring directions of the routing circuit layers, as long as they correspond to locations that elongate when the three dimensional shape is being imparted to the touch panel.

The mount parts of the electrode layers do not have to correspond to all width directions of the routing circuit layers. That is, in this case, the routing circuit layers are formed with a width greater than that of the mount parts and on both the mount parts and the base material sheets.

(10) Tenth Embodiment

Figure 16:
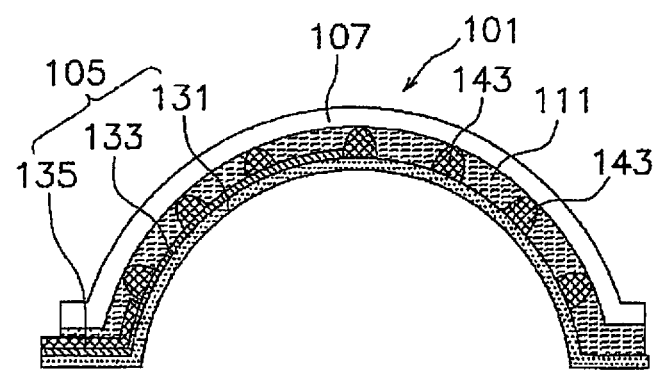
FIG. 16 is a cross sectional view of the touch panel according to an eleventh embodiment.

An embodiment will be further explained wherein a fluid material is used in the bonding layers and is set after the three dimensional shape has been imparted. In this case, in contrast to the case wherein an adhesive sheet is used in the bonding layer, it is assumed that there is a problem in that it is difficult to dispose the bonding layer with even thickness. Accordingly, to solve such a problem, it is conceivable to dispose spacers between the electrode film and the protective layer, as shown in FIG. 16. In FIG. 16, first spacers 143 are formed on the base material sheet 131. As a result, the thickness becomes even over the entirety between the electrode film 105 and the protective layer 107.

(11) Eleventh Embodiment

Figure 17:
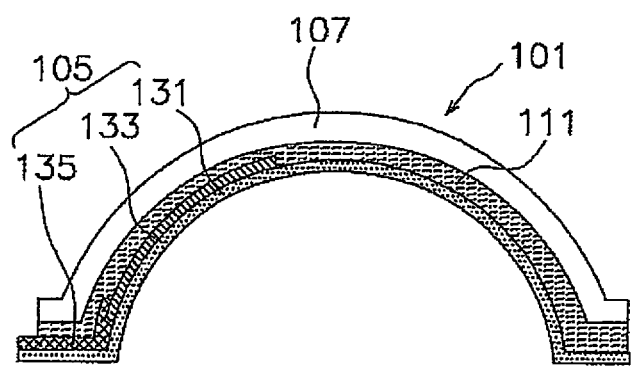
FIG. 17 is a cross sectional view of the touch panel according to a twelfth embodiment.

Furthermore, in an embodiment wherein a fluid material is used in the bonding layer and the material is set after the three dimensional shape has been imparted, the effect of preventing a discontinuity, even if the routing circuit layers are formed directly on the base material sheet, is achieved, as shown in FIG. 17.

The ninth through eleventh embodiments discussed above may be combined, as appropriate, with the fourth through eighth embodiments.

(12) Other Embodiments

The above text explained one embodiment of the present invention, but the present invention is not limited to the abovementioned embodiments, and it is understood that various modifications can be effected without departing from the scope of the invention. In particular, the plurality of embodiments and modified examples written in the present specification can be arbitrarily combined as needed.

(a) The shapes of the routing circuit layers may be varied in accordance with the degree of tension in the routing circuit layers.

(b) The three dimensional shape of the touch panel is not limited to a semispherical shape.

The present invention can be widely adapted to touch panels whereto three dimensional shapes have been imparted and to methods of manufacturing the same.

The invention claimed is:

1. A touch panel having a three dimensional shape, the touch panel comprising:
   a first base material having a bent portion;
   an electrode layer formed on a first surface of the first base material and containing a flexible material, the electrode layer including an electrode part and a mount part that extends from the electrode part, the mount part being formed on the bent portion such that the mount part is bent;
   a routing circuit layer formed on the mount part such that routing circuit layer is bent and electrically connected to the electrode layer;
   a second base material; and
   a bonding layer bonding the first surface of the first base material and the second base material and containing a macromolecular material that is set by the irradiation or elimination of energy rays.

2. The touch panel according to claim 1, wherein
   the routing circuit layer contains an electrically conductive material whose tensile elongation is 10% or greater.

3. A touch panel having a three dimensional shape, the touch panel comprising:
   a first base material;
   an electrode layer formed on a first surface of the first base material and containing a flexible material;
   a routing circuit layer formed on the first surface of the first base material and electrically connected to the electrode layer, at least part of the routing circuit layer including a portion that elongates in directions diagonal to wiring directions of the routing circuit layer;
   a second base material; and
   a bonding layer bonding the first surface of the first base material and the second base material and containing a macromolecular material that is set by the irradiation or elimination of energy rays.

4. A method of manufacturing a touch panel having a three dimensional shape, comprising:
   forming an electrode layer on a first surface of a first base material, the electrode layer including an electrode part and a mount part that extends from the electrode part;
   forming a routing circuit layer on the mount part such that the routing circuit layer is electrically connected to the electrode layer;
   adhering, by an elastic bonding layer, the first surface of the first base material and the second base material;
   imparting the three dimensional shape to the touch panel in which the first base material and the second base material have been adhered by bending a portion of the first base member where the mount part and the routing circuit layer are formed; and
   setting the bonding layer by the irradiation or elimination of energy rays.

5. The method of manufacturing a touch panel according to claim 4, wherein
   at least a location of the routing circuit layer that elongates by the step of imparting the three dimensional shape to the touch panel is formed by a tensile resistant conductive structure, whose tensile elongation relative to tension in the wiring directions is large; and
   a cross sectional area of a cross section perpendicular to the wiring directions of the tensile resistant conductive structure is greater than 1× and less than or equal to 16× a cross sectional area of a plane perpendicular to the wiring directions at locations other than the tensile resistant conductive structure of the routing circuit layer.

6. The method of manufacturing a touch panel according to claim 5, wherein
a thickness and a width of the tensile resistant conductive structure are greater than 1× and less than or equal to 4× a thickness and a width, respectively, of locations other than the tensile resistant conductive structure of the routing circuit layer.

* * * * *